(12) United States Patent
Rozmarynowski et al.

(10) Patent No.: US 12,042,888 B2
(45) Date of Patent: Jul. 23, 2024

(54) INVERTER-BASED GENERATOR AND WELDING SYSTEM

(71) Applicant: Hobart Brothers LLC, Troy, OH (US)

(72) Inventors: Scott Ryan Rozmarynowski, Greenville, WI (US); Darrell Lee Sickels, Troy, OH (US)

(73) Assignee: Hobart Brothers LLC, Troy, OH (US)

( * ) Notice: Subject to any disclaimer, the term of this patent is extended or adjusted under 35 U.S.C. 154(b) by 131 days.

(21) Appl. No.: 16/883,556

(22) Filed: May 26, 2020

(65) Prior Publication Data

US 2020/0282486 A1 Sep. 10, 2020

Related U.S. Application Data

(63) Continuation of application No. 15/935,674, filed on Mar. 26, 2018, now Pat. No. 10,661,374, which is a continuation of application No. 14/229,353, filed on Mar. 28, 2014, now Pat. No. 9,925,613.

(51) Int. Cl.
*B23K 9/10* (2006.01)
*B23K 9/32* (2006.01)

(52) U.S. Cl.
CPC .......... *B23K 9/1012* (2013.01); *B23K 9/1006* (2013.01); *B23K 9/1037* (2013.01); *B23K 9/1043* (2013.01); *B23K 9/327* (2013.01)

(58) Field of Classification Search
CPC .. B23K 9/1012; B23K 9/1006; B23K 9/1037; B23K 9/1043; B23K 9/327
See application file for complete search history.

(56) References Cited

U.S. PATENT DOCUMENTS

| | | |
|---|---|---|
| 5,601,741 A | 2/1997 | Thommes |
| 6,469,401 B2 | 10/2002 | Beeson |
| 6,987,242 B2 | 1/2006 | Geissler |
| 2003/0164645 A1 | 9/2003 | Crandell, III |
| 2004/0245219 A1 | 12/2004 | Moran |
| 2006/0037953 A1 | 2/2006 | Matthews |
| 2009/0159577 A1 | 6/2009 | Sommerfeld |
| 2009/0277881 A1* | 11/2009 | Bornemann ........... B23K 9/323 29/611 |
| 2010/0187210 A1* | 7/2010 | Albrecht .............. B23K 9/1006 219/133 |

(Continued)

FOREIGN PATENT DOCUMENTS

| | | |
|---|---|---|
| CN | 201287231 | 8/2009 |
| EP | 1484128 | 12/2004 |
| WO | 2009029360 | 12/2008 |

OTHER PUBLICATIONS

International Search Report from PCT application No. PCT/US2015/010250, dated Jun. 10, 2015, 11 pgs.

*Primary Examiner* — Brian W Jennison
(74) *Attorney, Agent, or Firm* — McAndrews, Held & Malloy, Ltd.

(57) ABSTRACT

A system includes an engine configured to drive a generator to produce a first power output, and a first inverter communicatively coupled to the generator. The first inverter is configured to convert the first power output into a second power output. The system includes a second inverter communicatively coupled to the generator. The second inverter is configured to convert the first power output into a third power output. The third power output includes a welding power output.

20 Claims, 3 Drawing Sheets

(56) References Cited

U.S. PATENT DOCUMENTS

| | | | |
|---|---|---|---|
| 2011/0006046 A1* | 1/2011 | Albrecht | H01M 16/006 |
| | | | 219/133 |
| 2011/0049115 A1* | 3/2011 | Luo | B23K 9/1006 |
| | | | 219/130.21 |
| 2012/0074116 A1 | 3/2012 | Matthews | |
| 2014/0042138 A1* | 2/2014 | Matthews | B23K 37/00 |
| | | | 219/130.21 |

* cited by examiner

INVERTER-BASED GENERATOR AND WELDING SYSTEM

CROSS REFERENCE TO RELATED APPLICATIONS

This application is a Continuation patent application of U.S. Non-Provisional application Ser. No. 15/935,674, entitled "Inverter-Based Generator And Welding System," filed Mar. 26, 2018, which is a Continuation patent application of U.S. Non-Provisional application Ser. No. 14/229,353, entitled "Inverter-Based Generator And Welding System," filed Mar. 28, 2014, both of which are herein incorporated by reference in their entirety for all purposes.

BACKGROUND

The invention relates generally to welding systems and, more particularly, to inverter-based welding systems.

Welding is a process that has become increasingly ubiquitous in various industries and applications. As such, a variety of welding applications, such as construction and shipbuilding, may require welding devices that are portable and can easily be transported to a remote welding location. Accordingly, in some cases, it is often desirable for such welding devices to be operable as standalone units remote from a power grid or other primary power source. Therefore, a variety of welding systems utilizing alternate power sources, such as small gasoline-fueled engines, have been developed. However, certain welding tasks such as welding performed off-road or remotely to quickly repair certain equipment and/or other machinery, for example, may include load demands that are very small as compared to other larger welding tasks. It may be useful to provide a more compact and efficient portable welding system.

BRIEF DESCRIPTION

In one embodiment, a system includes an engine configured to drive a generator to produce a first power output, and a first inverter communicatively coupled to the generator. The first inverter is configured to convert the first power output into a second power output. The system includes a second inverter communicatively coupled to the generator. The second inverter is configured to convert the first power output into a third power output. The third power output includes a welding power output.

In a second embodiment, a welding power supply unit includes an engine configured to drive a generator to produce a first power output, and a first inverter communicatively coupled to the generator. The first inverter is configured to convert the first power output into a second power output. The welding power supply unit includes a second inverter communicatively coupled to the generator. The second inverter is configured to convert the first power output into a welding power output. The welding power supply unit includes a welding torch detachably coupled to the welding power supply unit and configured to receive the welding power output.

In a third embodiment, a welding system includes an enclosure. The enclosure includes an engine configured to drive a generator to produce a first power output, and a plurality of inverters communicatively coupled to the generator. The plurality of inverters is configured to convert the first power output into a second power output and a third power output concurrently. The third power output includes a welding power output.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Present embodiments relate to an inverter-based generator and welding system. In certain embodiments, the inverter-based generator and welding system may be useful in permitting the system to be moved from place to place relatively easily, or may be designed as a generally stationary system. Moreover, the inverter-based generator and welding system may be designed for field operation, in which case it may include an engine-generator unit within the enclosure that provides the necessary power for a given welding operation. Thus, the inverter-based generator and welding system may be designed for use in various applications and locations (e.g., remote locations, locations away from typical work areas or workstations, off-road locations, and so forth) in which one or more sources of utility power may be at least temporarily inaccessible. Furthermore, in certain embodiments, the inverter-based generator and welding system may be configured to operate as a standalone generator, a standalone welder, or concurrently as a standalone generator and as a standalone welder. In this manner, the inverter-based generator and welding system may provide an operator with the advantage of having sufficient power for auxiliary equipment (e.g., lighting at a campsite or other off-road worksite) as well as sufficient power to perform one or more welding operations (e.g., at the campsite or the off-road worksite).

Figure 1:
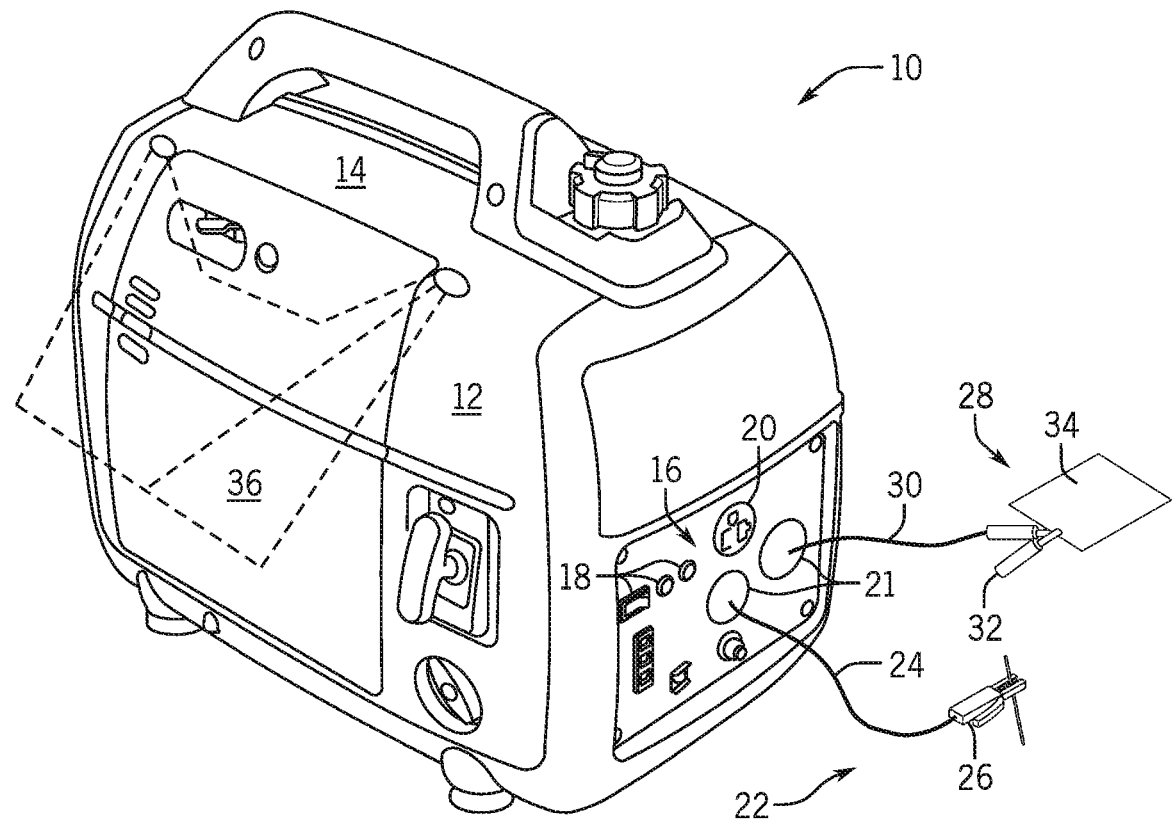
FIG. 1 is a perspective view of an inverter-based power supply unit, which functions to power, control, and provide consumables to a welding operation and/or auxiliary equipment.

With the foregoing in mind, an embodiment of a generator and welding system, such as an inverter-based generator and welding system 10, is illustrated in FIG. 1. The inverter-based welding system 10 may provide power and control for a welding operation and/or auxiliary equipment. The inverter-based welding system 10 may include a power supply unit 12 enclosed in a cabinet or enclosure 14. As previously noted, in certain embodiments, the inverter-based welding system 10 may be useful in enabling the power supply unit 12 to be moved from place to place relatively easily, or may be designed as a generally stationary system. Moreover, the inverter-based welding system 10 may be designed for field operation, in which case it may include, for example, one or more of an engine-generator unit, a fuel cell, and an energy storage device within the enclosure 14 that provide the necessary power for a given welding operation or other application. In certain embodiments, the inverter-based welding system 10 may be designed for use in various locations (e.g., remote locations, locations away from typical work areas or workstations, off-road locations, and so forth) in which one or more sources of utility power may be at least temporarily inaccessible. Thus, the power supply unit 12 may operate as a standalone unit, generating the power necessary for a welding operation and/or auxiliary operations while isolated from additional power sources.

As further illustrated by FIG. 1, the power supply unit 12 may include a control panel 16, through which an operator may, for example, control the machine operational characteristics, such as power, weld output, and so forth, for a welding operation via dials and switches 18. The control panel 16 may also include an auxiliary power output receptacle 20 and welding power output connectors 21 for outputting alternating current (AC) and/or direct current (DC) output power, respectively. As the operator adjusts operating parameters via the control panel 16, signals may be generated and received by one or more control circuits that may be included within the power supply unit 12. The power supply unit 12 controller may implement the desired welding operation in accordance with these inputs. For example, in one embodiment, the controller may implement a constant current regime for use with a shielded metal arc welding (SMAW) or stick welding operation and/or process type.

In certain embodiments, an electrode assembly 22 may extend from the welding power output connectors 21 of the power supply unit 12 to the location of the weld. A first cable 24 and a welding torch 26 may be coupled to the power supply unit 12 as components of the electrode assembly 22. The welding torch 26 may be used to secure a welding electrode suitable for shielded metal arc welding (SMAW) (e.g., stick welding) operations. A work assembly 28 extending from the welding power output connectors 21 of the power supply unit 12 to the weld includes a second cable 30 terminating in a work lead clamp 32. During, for example, a weld operation, the work lead clamp 32 may be coupled to a workpiece 34 to create a circuit between the welding torch 26, the workpiece 34, and the power supply unit 12. That is, as the welding operator, for example, contacts or closely approaches the tip of the electrode of the welding torch 26 to the workpiece 34, an electrical circuit is completed through the cables 24 and 30, the welding torch 26, the workpiece 34, and the work lead clamp 32 to generate an electrical arc between the electrode tip and the workpiece 34 to perform a weld of the workpiece 34.

In certain embodiments, as further illustrated by FIG. 1, a detachable (e.g., removable) receptacle 36 may be included as part of the power supply unit 12. The detachable receptacle 36 may be useful in storing one or more components of the inverter-based welding system 10. For example, the detachable receptacle 36 may be a pouch, a tote, or similar receptacle that may couple to an exterior portion of the power supply unit 12. As the inverter-based welding system 10 may be used as a portable (e.g., capable of being hand-carried by a single operator or transported from place to place by a single operator) generator and/or welding generator, the detachable receptacle 36 may be provided to facilitate the portability of the inverter-based welding system 10. For example, the detachable receptacle 36 may be used by an operator of the inverter-based welding system 10 to package or store one or more components (e.g., the cable 24, the welding torch 26, and so forth) of the electrode assembly 22 and/or components (e.g., the cable 30, the work lead clamp 32, and so forth) of the work assembly 28.

Figure 2:
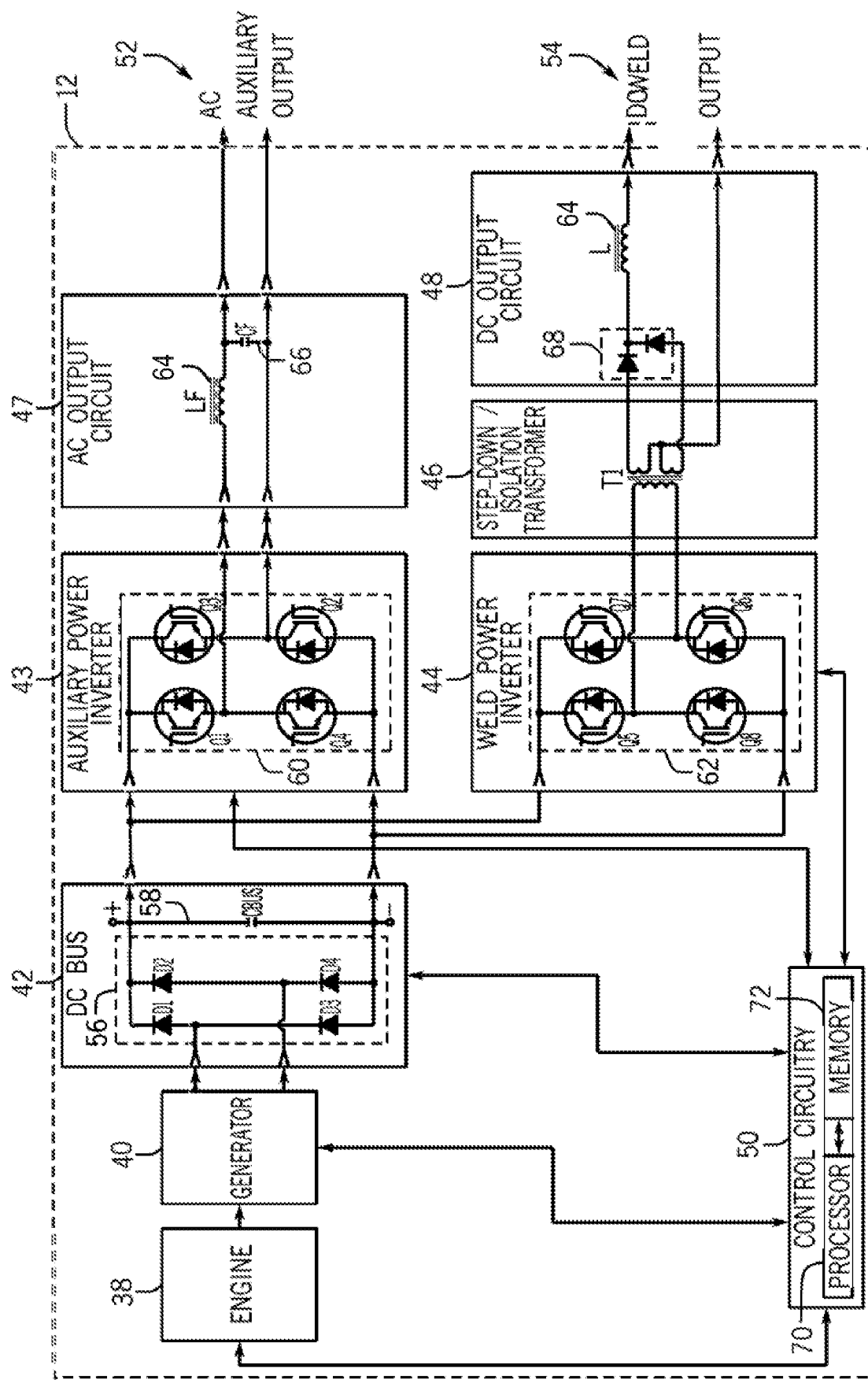
FIG. 2 is a schematic diagram of the inverter-based power supply unit of FIG. 1 including a welding circuit, in accordance with present embodiments.

FIG. 2 illustrates a schematic embodiment of the inverter-based power supply unit 12 of FIG. 1. As illustrated, the inverter-based power supply unit 12 may include an engine 38, a generator 40, a DC bus 42, inverters 43 and 44, a step-down and/or isolation transformer 46, output circuits 47 and 48, and control circuitry 50 all enclosed within the single enclosure 14. In certain embodiments, the inverter-based power supply unit 12 may be used to generate commanded power output levels for an auxiliary operation and/or welding operation, as described in detail below. Such commanded power output levels may be commanded based on one or more of amperage, voltage, wire type, wire feed speed, electrode diameter, and so forth. As such, the engine 38 may be used to drive the generator 40 to produce power (e.g., electrical power), which may be utilized to provide an auxiliary power output 52 (e.g., AC electrical output), to power an additional device or other auxiliary equipment (e.g., lights, grinding equipment, cutting tools, and so forth) and/or to produce a welding power output 54 (e.g., DC electrical output).

The engine 38 may include a fuel source useful in providing power to the generator 40. The engine 38 may include a combustion engine powered by gasoline, diesel, LP fuel, natural gas, or other fuels, and may be configured to drive one or more rotating drive shafts. For example, in one embodiment, the engine 38 may include an industrial gas/diesel engine having a power rating of below approximately 15 hp, below approximately 10 hp, or below approximately 5 hp. Thus, at the aforementioned power ratings and physical size, the engine 38 may be referred to as a small industrial engine. The generator 40 coupled to the engine 38 may convert the power output (e.g., mechanical energy) of the engine 38 into electrical power, producing an alternating current (AC) voltage output. In certain embodiments, the generator 40 may be rated at less than approximately 1000 watts (W), less than approximately 2000 W, less than approximately 3000 W, less than approximately 4000 W, or otherwise up to approximately 5000 W.

As previously noted, the power supply unit 12 may include the DC bus 42 and the inverters 43 and 44. The DC bus 42 may include a bridge rectifier 56 connected to a bus capacitance 58 (Cbus). In certain embodiments, the bridge rectifier 56 may include a configuration (e.g., an H-bridge configuration) of diodes (e.g., D1, D2, D3, and D4) for converting (e.g., rectifying) the incoming AC voltage signal (e.g., 115V, 120V, 200V, 208V, 230V, or similar voltage rating) generated via the generator 40 into a filtered direct current (DC) voltage signal. If a low AC voltage is supplied by the generator 40, a boost circuit could be incorporated into the DC bus 42 to raise the voltage to the desired operational level. The rectified and filtered DC voltage signal may then be transmitted to power switches 60 (e.g., semiconductor switches Q1, Q2, Q3, Q4) of the auxiliary inverter 43 or to power switches 62 (e.g., semiconductor switches Q5, Q6, Q7, Q8) of the welding power inverter 44 to respectively produce the AC auxiliary power output 52 and the DC welding power output 54.

Specifically, the power switches 60 (e.g., switches Q1, Q2, Q3, Q4) may convert the rectified and filtered DC voltage signal into an AC voltage signal, which may be then filtered via an inductor 64 and capacitor 66 of the output circuit 47 to produce a constant AC auxiliary power output 52. It should be appreciated that the power switches 60 and 62 may include any configuration of integrated power electronic switching devices such as insulated gate bipolar transistors (IGBTs), field-effect transistors (FETs), and so forth, which may be controlled (e.g., by the control circuitry 50) to switch from "ON" (e.g., activated) and "OFF" (e.g., deactivated) states to control the power conversion via the inverter 43 and/or inverter 44, and by extension, the AC auxiliary power output 52 and the DC welding power output 54.

For example, in a similar manner, the power switches 62 (e.g., switches Q5, Q6, Q7, Q8) may convert the rectified and filtered DC voltage signal into an AC voltage signal, which may be then reduced (e.g., stepped down) via a step-down and/or isolation transformer 46 to a voltage level (e.g., approximately 70 VAC, or other similar voltage rating) suitable for producing a welding power output. The transformer 46 may be any device capable of reducing the AC voltage signal produced, for example, by the power switches 62 of the inverter 44 to a voltage level suitable for producing a welding power output to supply to the welding torch 26. The transformer 46 may also be used to isolate the welding-specific circuitry of the inverter-based power supply unit 12 from the AC auxiliary power output 52 circuitry of the power supply unit 12. The output circuit 48 may then convert the welding-level AC voltage signal received from the transformer 46 back into a DC voltage signal via an output rectifier 68. The new DC voltage signal may be then useful for supporting various welding operations and/or processes (e.g., a SMAW welding process).

Although not illustrated, as previously noted, it should be appreciated that the AC auxiliary power output 52 may be used to power another external device and/or other auxiliary equipment. For example, the inverter-based power supply unit 12 may supply the voltage AC auxiliary power output 52 to external lighting equipment, grinding equipment, cutting tools, and so forth. Likewise, as noted above, the inverter-based power supply unit 12 may also be used to generate a welding power output, for example, to perform one or more welding operations. Furthermore, by providing the inverters 43 and 44 in conjunction with the engine 38 and generator 40, the inverter-based power supply unit 12 may operate markedly quieter than other generator and/or welding systems.

In certain embodiments, as further illustrated by FIG. 2, the engine 38, the generator 40, the DC bus 42, and the inverters 43 and 44 may each be controlled and/or commanded by the control circuitry 50. The control circuitry 50 may include an analog control circuit, or it may include a processor 70 and/or other data processing circuitry that may be communicatively coupled to a memory 72 to execute instructions to control, for example, one or more parameters of the engine 38, the generator 40, and the bridge rectifier 56, and the power switches 60 and 62 of the respective inverters 43 and 44. These instructions may be encoded in programs or code stored in tangible non-transitory computer-readable medium, such as the memory 72 and/or other storage. The processor 70 may be a general purpose processor, system-on-chip (SoC) device, application-specific integrated circuit (ASIC), or other processor configuration. Similarly, the memory 72 may include, for example, random-access memory (RAM), read-only memory (ROM), flash memory (e.g., NAND), and so forth.

In one embodiment, the control circuitry 50 may be useful in controlling the power switches 60 and 62 of the respective inverters 43 and 44, or other components of the inverter-based power supply unit 12 to produce a stabilized AC power output (e.g., AC auxiliary power output 52) to power auxiliary equipment and/or a stabilized DC welding power output to support one or more welding operations and/or processes. For example, the inverter-based power supply unit 12 may be used to support a stick (SMAW) welding process, which may generally use a constant current (CC) welding power output controlled by the control circuitry 50. In such an embodiment, the control circuitry 50 may control the amperage output (e.g., amperage of an electrical arc generated via the welding torch 26) to a predetermined CC value by adjusting voltage and/or amperage feedback signals detected at the output stage of the inverter 44. In other embodiments, the inverter-based power supply unit 12 may be used to perform other user-selected welding processes, such as a flux cored welding process, a metal inert gas (MIG) welding process, and the like.

In certain embodiments, the welding power output 54 may be generated in place of, in addition to, or concurrently (e.g., at the same time) with the AC auxiliary power output 52. That is, the power supply unit 12 may produce the AC auxiliary power output 52 and the DC welding power output 54 substantially simultaneously (e.g., occurring at substantially the same time) and/or concurrently (e.g., occurring in parallel or at substantially the same time). For example, during operation, if the power supply unit 12 is operating at an output power rating of, for example, approximately 3000 W, the power supply unit 12 may provide 3000 W of power as the AC auxiliary power output 52, 3000 W of power as the DC welding power output 54, or concurrently provide 1500 W for each of the AC auxiliary power output 52 and the DC welding power output 54 at substantially the same time.

Nevertheless, it should be appreciated that the power provided as the respective power outputs 52 and 54 may be dependent upon the specific auxiliary equipment receiving the power output 52 and/or the specific welding operation or task being performed via the power output 54. Thus, when the power supply unit 12 supplies the power outputs 52 and 54 concurrently, the total power output (e.g., 1000 W, 2000 W, 3000 W, 3500 W, and so forth) may or may not be divided evenly between the respective power outputs 52 and 54. Furthermore, as the present embodiments of the inverter-based power supply unit 12 may be designed for use in various locations (e.g., remote locations, locations away from typical work areas or stations, off-road locations, and so forth), having the ability to operate as a standalone generator, a standalone welder, or concurrently as a standalone generator and as a standalone welder may allow an operator the advantage of having sufficient power for auxiliary equipment (e.g., lighting at a campsite or other off-road worksite) as well as sufficient power to perform one or more welding operations (e.g., at the campsite or the off-road worksite).

Figure 3:
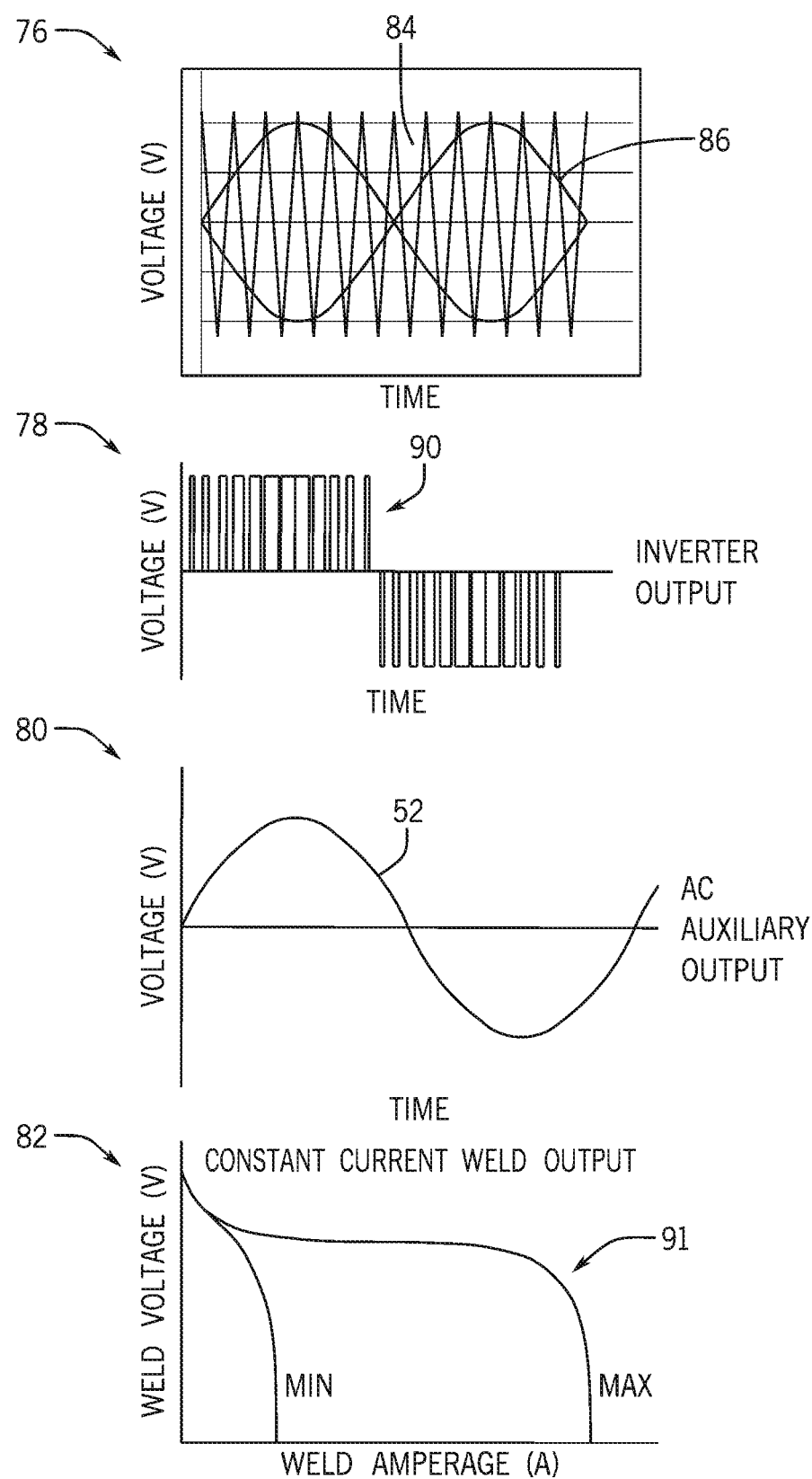
FIG. 3 is a series of plots illustrating the power conversion techniques and outputs of the inverter-based power supply unit of FIG. 1, in accordance with present embodiments.

FIG. 3 depicts a series of waveform plots 76, 78, 80, and 82 illustrating examples of the previously discussed power conversion and control techniques of the inverter-based power supply unit 12 implemented using, for example, the control circuitry 30. As illustrated by plot 76 of FIG. 3, the control circuitry 50 may generate a reference sine wave AC voltage signal 86 (e.g., modulating signal) to be compared against a generated triangular wave AC voltage signal 84 (e.g., saw-tooth carrier signal). Similarly, the control circuitry 50 may also compare an inversion of the sine wave AC voltage signal 86 against the triangular wave AC voltage signal 84. The AC voltage signal 86 may also be totally synthesized within software stored in the memory 72 of the in the control circuitry 50. The signals 84 and 86 may then be used to drive and/or control the power switches 60 of the inverter 43 and/or the power switches 62 of the inverter 44. The resultant output voltage signal of the inverter 43 and/or the inverter 44 may be a pulse-width modulated (PWM) inverted signal 90 as illustrated by plot 78. To produce the auxiliary power output 52, the signal 90 may be then filtered (e.g., filtered via the AC output circuit 47) to produce a filtered (e.g., "clean" and stabilized) AC voltage signal as the auxiliary power output 52, as illustrated by plot 80. As previously noted, the auxiliary power output 52 may be provided at the power receptacle 20 of the inverter-based power supply unit 12 to which an external device and/or other auxiliary equipment (e.g., lighting equipment, grinding equipment, cutting tools, and so forth) may be coupled.

In a similar manner, to produce the welding power output 54, a volt amp signal 91 of plot 82 may be reduced (e.g., stepped down) via the transformer 46 and converted via the DC output circuit 48 to produce a DC welding voltage signal (e.g., CC welding output) as the welding power output 54, as illustrated by plot 82. As also previously noted, the welding power output 54 may be provided to the welding torch 26 of the inverter-based power supply unit 12, which may be then used to generate an electrical arc to perform one or welding operations and/or processes. It should again be appreciated that the inverter-based power supply unit 12 may produce the auxiliary power output 52 and the welding power output 54 individually or substantially simultaneously (e.g., in parallel).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
    a direct current (DC) bus comprising a rectifier connected to a bus capacitance and configured to provide DC power from a first power output of a generator;
    a first inverter coupled to the generator via the DC bus, wherein the first inverter is configured to convert the first power output into a second power output, wherein the second power output comprises an alternating current (AC) auxiliary power output; and
    a second inverter coupled to the generator via the DC bus and to a welding output circuit, wherein the second inverter is configured to convert the first power output into a third power output, wherein the third power output comprises a DC welding power output.

2. The system of claim 1, further comprising an engine configured to drive the generator to produce the first power output, wherein the engine comprises a power rating of approximately 10 horsepower (hp) or less.

3. The system of claim 1, wherein the generator comprises a power rating of approximately 3500 watts (W) or less.

4. The system of claim 1, wherein the first inverter and the second inverter each comprises a plurality of power switches configured to invert the first power output in parallel.

5. The system of claim 4, comprising a welding torch, wherein the DC welding power output is delivered to the welding torch.

6. The system of claim 1, wherein the system comprises a portable, self-contained power supply unit configured to produce the second power output and the third power output substantially simultaneously.

7. The system of claim 1, wherein the first inverter is configured to provide the second power output to an auxiliary device coupled to the system.

8. The system of claim 1, comprising:
    a transformer coupled to the second inverter, wherein the transformer is configured to reduce the third power output;
    wherein the welding output circuit is coupled to the transformer and configured to rectify the third power output to provide the DC welding power output.

9. The system of claim 1, comprising a welding torch and a work lead clamp, wherein the welding torch is configured to receive the DC welding power output to generate a welding arc.

10. The system of claim 1, comprising control circuitry, wherein the control circuitry is configured to adjust the DC welding power output according to a user-selected welding process type.

11. The system of claim 10, wherein the user-selected welding process type comprises a shielded metal arc welding (SMAW) process.

12. A welding power supply unit, comprising:
    a direct current (DC) bus comprising a boost converter and a rectifier connected to a bus capacitance, the DC bus configured to provide a first DC power output;
    a first inverter coupled to a generator via the DC bus, wherein the first inverter is configured to convert the first DC power output into a second power output for an auxiliary device;
    a second inverter coupled between the generator via the DC bus and a welding output circuit, wherein the second inverter is configured to convert the first DC power output into a welding power output; and
    a welding torch detachably coupled to the welding power supply unit and configured to receive the welding power output.

13. The welding power supply unit of claim 12, wherein the first inverter is configured to convert the first power output into the second power output and to provide the second power output to an auxiliary device coupled to the welding power supply unit, wherein the second power output comprises an alternating current (AC) auxiliary power output.

14. The welding power supply unit of claim 12, wherein the welding power supply unit comprises a portable, self-contained power supply unit configured to produce the second power output and the welding power output substantially simultaneously.

15. The welding power supply unit of claim 12, wherein the engine comprises a power rating of approximately 10 horsepower (hp) or less, and the generator comprises a power rating of approximately 3500 watts (W) or less.

16. The welding power supply unit of claim 12, comprising:
    a transformer coupled to the second inverter, wherein the transformer is configured to reduce the second power output to a third power output;
    wherein the welding output circuit is coupled to the transformer and configured to rectify the third power output to provide a direct current (DC) welding power output as the welding power output to the welding torch.

17. A welding system, comprising:
    an enclosure, comprising:
        a direct current (DC) bus comprising an H-bridge rectifier to receive a first power output from a generator driven by an engine; and
        a plurality of inverters coupled to the generator via the DC bus, wherein the plurality of inverters is configured to convert the first power output into a second power output and a third power output substantially concurrently,
        wherein the second power output comprises an auxiliary power output delivered to an auxiliary output circuit, and the third power output comprises a welding power output delivered to a welding output circuit.

18. The welding system of claim 17, comprising a receptacle detachably coupled to the welding system, wherein the receptacle comprises a pouch or a tote configured to detachably couple to an external portion of the welding system.

19. The welding system of claim 17, wherein the plurality of inverters is configured to convert the first power output into an alternating current (AC) auxiliary power output as the second power output, and to convert the first power output into a direct current (DC) power output as the welding power output.

20. The welding system of claim 17, comprising one or more components configured to detachably couple to the welding system to perform an operation, wherein the one or more components comprises a welding cable, a welding torch, a work lead clamp, an auxiliary device, or any combination thereof.

* * * * *